3,287,362
SUBSTITUTED 3-OXO-3,4-DIHYDRO-1,2,4-BENZO-THIADIAZINE 1,1-DIOXIDES AND A METHOD FOR THEIR PREPARATION

Richard Hürmer, Les Charmettes, Le Mee-sur-Seine, France, and Jean Vernin, Trogerstr. 54/III, Munich, Germany
No Drawing. Filed May 25, 1962, Ser. No. 197,616
6 Claims. (Cl. 260—243)

This invention relates to novel 2-substituted 3-oxo-3,4-dihydro-1,2,4-benzothiadiazine-1,1-dioxides having utility as pharmacodynamic agents. The novel 2-substituted 3 - oxo - 3,4 - dihydro - 1,2,4 - benzothiadiazine - 1,1 - dioxide compounds of this invention have particular utility as sedatives and hypnotics and have a minimum of side effects.

Heretofore, very little, if anything, was known of the pharmacological activity of 3-oxo-dihydrobenzothiadiazine-1,1-dioxides other than the compound 7-sulfamil-3-oxo-dihydrobenzothiadiazine-1,1-dioxides exhibited a diuretic effect. 3-oxo-3,4-dihydro-1,2,4-benzothiadiazine-1,1-dioxide has been prepared, but the only property so far attributed thereto is that the same is possessed of a very sweet taste.

In accordance with the invention, it has now been found that 3-oxo-3,4-dihydro-1,2,4-benzothiadiazine-1,1-dioxides have particular marked hypnotic and sedative effects and have at the same time a minimum of undesirable side effects. More specifically, the novel 2-substituted 3 - oxo-3,4-dihydro-1,2,4-benzothiadiazine-1,1-dioxides of this invention are represented by the following structure:

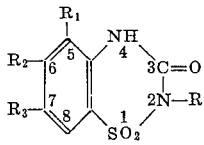

wherein $R_1$, $R_2$ and $R_3$ each represents a member selected from the group consisting of hydrogen, halogen, trihalomethyl, alkyl, alkoxy, aryl, acyl, alkenyl, amino, and their substitution products, and R represents one of alkyl, aryl, aralkyl, alkylaryl, alkoxyalkyl, alkoxyaryl, alkylthioalkyl, or alkylthioaryl and their substitution products, wherein the substituent may be a cycloaliphatic or heterocyclic moiety.

The 3-oxo-dihydrobenzothiadiazines of this invention are prepared by condensing a correspondingly substituted o-aminobenzenesulfonamide with a urea, a urea derivative such as urethane, phosgene or chlorocarbonic acid ester.

The following examples are drawn to illustrate novel compounds of this invention and will serve to illustrate procedures for the preparation of the compounds.

It will be readily apparent to one skilled in the art that variations of these procedures are possible.

Example 1

Ten grams of o-amino-N-o-toluidinobenzenesulfonamide are heated with 3 grams of urea in an oil bath for 3 hours at 180° C., and thereafter the temperature is raised to 220° C. and the heating continued for half an hour. After cooling, the solid is comminuted and digested with water to remove the unreacted urea, and the residue is recrystallized from methanol. A 90% yield is obtained of 2-o-toluidino-3-oxo-3,4-dihydro-1,2,4-benzothiadiazine-1,1-dioxide.

Example 2

Twelve grams of o-amino-N-p-trifluoromethylphenyl-benzenesulfonamide are heated with 5 grams of ethylurethane on an oil bath for 2 hours at 180° to 190° C., and for another 30 minutes at 220° C. After working up the reaction product, 2-p-trifluoromethylphenyl-3-oxo-3,4-dihydro-1,2,4-benzothiadiazine-1,1-dioxide is recovered.

Example 3

Ten grams of o-amino-N-cyclopentylbenzenesulfonamide are heated with 4 grams of urea for 2 hours on an oil bath at 190° C., and for another 30 minutes at 220° C. After working up the reaction product, there is recovered 2-cyclopentyl-3-oxo-3,4-dihydro-1,2,4-benzothiadiazine-1,1-dioxide. Yield is about 84%.

All of the products of the invention possess marked sedative and hypnotic activity and are remarkably free from undesirable side effects.

The products of the invention may be combined with a pharmaceutical carrier for administration to humans in an amount to attain the desired pharmacodynamic effect. Such carriers are either solid or liquid. Exemplary of solid pharmaceutical carriers are lactose, corn starch, mannitol, talc, etc. The compounds of this invention are mixed with the carrier and filled into hard gelatin capsules or tableted with suitable tableting aids, such as magnesium stearate, starch, or other lubricants, disintegrants or coloring agents. If combination with a liquid carrier is desirable, a soft gelatin capsule is filled with a slurry of the novel compounds in soybean or peanut oil.

What is claimed is:

1. 2-p-trifluoromethylphenyl-3-oxo-3,4-dihydro - 1,2,4-benzothiadiazine-1,1-dioxide.

2. 2-o-toluidino-3-oxo-3,4-dihydro - 1,2,4 - benzothiadiazine-1,1-dioxide.

3. 2-cyclopentyl-3-oxo-3,4-dihydro - 1,2,4 - benzothiadiazine-1,1-dioxide.

4. A method of preparing 2-o-toluidino-3-oxo-3,4-dihydro-1,2,4-benzothiadiazine-1,1-dioxide, which comprises reacting o-amino-N-o-toluidinobenzenesulfonamide with urea at a temperature of from 180 to 220° C. for a time sufficient for cyclization to occur, and recovering the 2-o-toluidino-3-oxo-3,4,-dihydro-1,2,4-benzothiadiazine - 1,1-dioxide.

5. A process of preparing 2-cyclopentyl-3-oxo-3,4-dihydro-1,2,4-benzothiadiazine-1,1-dioxide, which comprises reacting o-amino-N-cyclopentylbenzenesulfonamide with urea at a temperature of from 190 to 220° C. for a time sufficient for cyclization to occur, and recovering the 2-cyclopentyl - 3 - oxo-3,4-dihydro-1,2,4-benzothiadiazine-1,1-dioxide.

6. A method of preparing 2-p-trifluoromethylphenyl-3-oxo-3,4-dihydro-1,2,4-benzothiadiazine - 1,1 - dioxide, which comprises reacting o-amino-N-p-trifluoromethylphenylbenzenesulfonamide with ethylurethane at a temperature of from about 180 to 220° C. for a time sufficient for cyclization to occur, and recovering the 2-p-trifluoromethylphenyl-3-oxo-3,4-dihydro-1,2,4 - benzothiadiazine-1,1-dioxide.

References Cited by the Examiner
UNITED STATES PATENTS

| | | | |
|---|---|---|---|
| 2,886,566 | 5/1959 | Novello | 260—243 |
| 2,910,473 | 10/1959 | Novello | 260—243 |
| 3,051,620 | 8/1962 | Abood | 167—65 |
| 3,056,726 | 10/1962 | Marsh. | |

OTHER REFERENCES

German Auslegeschrift 1,067,028, Oct. 15, 1959.

Parke et al.: J. Chem. Soc. (London) pp. 1760–1763 (1950).

Scott, J.: Chem. Soc. (London) vol. 123, pp. 3191–3202 (1923).

Yale: Jour of Medicinal and Pharmaceutical Chemistry RS1J5 vol. 1 No. 2, pp. 122–133, 1959.

NICHOLAS S. RIZZO, *Primary Examiner.*